United States Patent
Wu

(10) Patent No.: US 11,644,998 B2
(45) Date of Patent: May 9, 2023

(54) SERVER AND METHOD FOR MANAGING DISTRIBUTED STORAGE

(71) Applicant: HON HAI PRECISION INDUSTRY CO., LTD., New Taipei (TW)

(72) Inventor: Chia-Chun Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 12 days.

(21) Appl. No.: 17/400,473

(22) Filed: Aug. 12, 2021

(65) Prior Publication Data
US 2022/0050596 A1 Feb. 17, 2022

(30) Foreign Application Priority Data

Aug. 12, 2020 (CN) .......................... 202010808801.6

(51) Int. Cl.
*G06F 3/00* (2006.01)
*G06F 3/06* (2006.01)

(52) U.S. Cl.
CPC ............ *G06F 3/065* (2013.01); *G06F 3/0604* (2013.01); *G06F 3/067* (2013.01); *G06F 3/0622* (2013.01); *G06F 3/0644* (2013.01); *G06F 3/0659* (2013.01); *G06F 3/0683* (2013.01)

(58) Field of Classification Search
None
See application file for complete search history.

(56) References Cited

U.S. PATENT DOCUMENTS

| | | | | |
|---|---|---|---|---|
| 7,899,985 | B2 * | 3/2011 | Saika | .................. G06F 16/1824 711/111 |
| 2011/0119616 | A1 * | 5/2011 | Suzuki | ..................... G06F 3/147 715/772 |
| 2022/0066682 | A1 * | 3/2022 | Yonekura | .............. G06F 3/0604 |
| 2022/0129170 | A1 * | 4/2022 | BenHanokh | .......... G06F 3/0623 |

FOREIGN PATENT DOCUMENTS

| | | |
|---|---|---|
| CC | 109582404 | 4/2019 |
| TW | I578168 | 4/2017 |

* cited by examiner

*Primary Examiner* — Midys Rojas
(74) *Attorney, Agent, or Firm* — ScienBiziP, P.C.

(57) ABSTRACT

A method for managing distributed storage implemented in a server includes obtaining files to be stored from a user; performing processing for distribution on the files to be stored; determine a storage requirement of the files to be stored, wherein the storage requirement can comprise file storage and object storage; storing the distributed files into a plurality of storage areas through a distributed storage unit when the storage requirement of the files to be stored is determined to be the file storage; and storing the distributed files into the plurality of storage areas through a distributed storage unit and an object storage unit when the storage requirement of the files to be stored is determined to be the file storage.

12 Claims, 5 Drawing Sheets

SERVER AND METHOD FOR MANAGING DISTRIBUTED STORAGE

CROSS-REFERENCE TO RELATED APPLICATIONS

This application claims priority to Chinese Patent Application No. 202010808801.6 filed on Aug. 12, 2020, the contents of which are incorporated by reference herein.

FIELD

The subject matter herein generally relates to storage, and particularly to a server and a method for managing distributed storage.

BACKGROUND

A variety of storage methods including file storage and object storage are widely used. For file storage such as NFS, CIFS, FTP, which includes directories and files, data of the file storage is stored and accessed in the form of files, and is organized according to a directory structure. Object storage, such as Amazon S3, is a universal identification code, it includes data and metadata packaged together as a whole object and stored in a large storage resource. However, such file storage system is usually not easy to expand, and is not convenient to store a large number of files or large-capacity files, so the object storage system may have a certain time delay or error during data synchronization, and the cost is relatively high.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
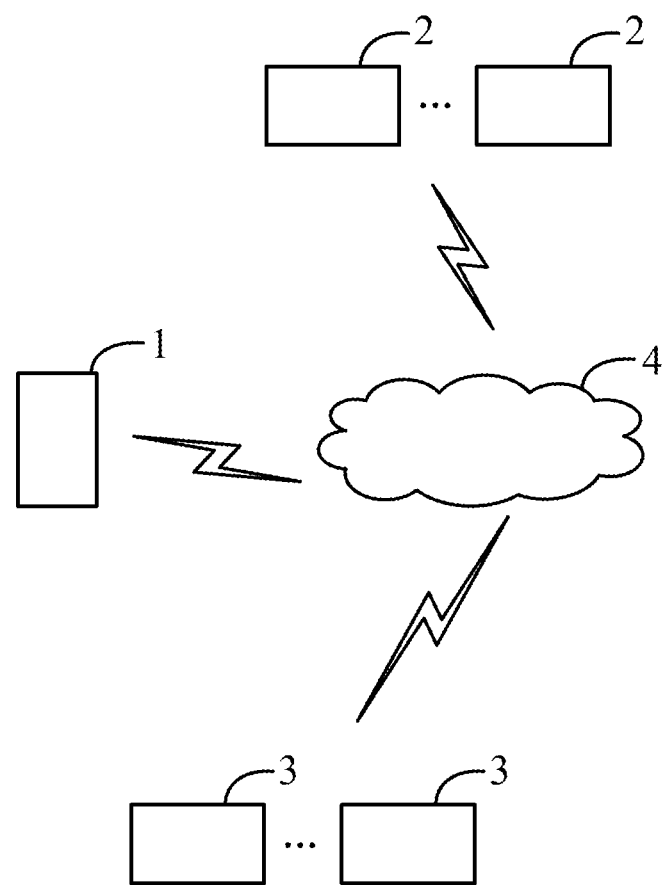
FIG. 1 is a schematic view of an embodiment of an application environment of a server according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the presented disclosure.

The presented disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

Referring to FIG. 1, a server (server 1) communicates with a number of sub-servers 2 and at least one client device 3 through a network 4. In one embodiment, the network 4 can be wired network or wireless network. The wireless network can be radio, WI-FI, cellular, satellite, broadcast, etc.

In one embodiment, the server 1 runs distributed storage programs. The server 1 can be a single server, a server cluster, or a cloud server. The client device 3 can be a smart phone or a personal computer. The client device 3 runs a distributed storage application. The user can store files through the distributed storage application of the client device 3.

Figure 2:
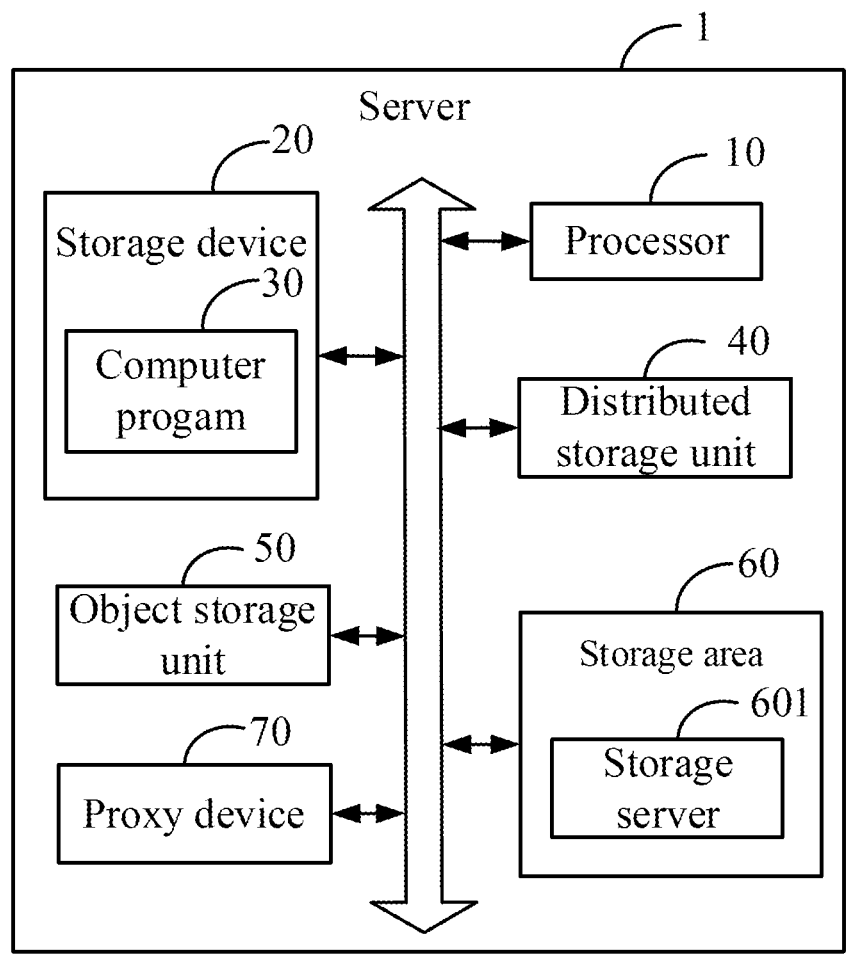
FIG. 2 is a block diagram of an embodiment of a server according to the present disclosure.

FIG. 2 illustrates the server 1 in one embodiment. The server 1 includes, but is not limited to, a processor 10, a storage device 20, a computer program 30, a number of distributed storage units 40, a number of object storage units 50, a number of storage areas 60, and a proxy device 70. FIG. 2 illustrates only one example of the server 1. Other examples can include more or fewer components than as illustrated or have a different configuration of the various components in other embodiments.

The processor 10 can be a central processing unit (CPU), a microprocessor, or other data processor chip that performs functions of the server 1.

In one embodiment, the storage device 20 can include various types of non-transitory computer-readable storage mediums. For example, the storage device 20 can be an internal storage system, such as a flash memory, a random access memory (RAM) for the temporary storage of information, and/or a read-only memory (ROM) for permanent storage of information. The storage device 20 can also be an external storage system, such as a hard disk, a storage card, or a data storage medium.

In one embodiment, the distributed storage unit 40 can be a distributed storage interface for storing files into the storage area 60 through a distributed storage service.

In one embodiment, the object storage unit 50 can be an object storage interface for storing files into the storage area 60 through an object storage service.

In one embodiment, the storage area 60 includes at least one storage server 601. The storage area 60 is configured for storing the files. The at least one storage server 601 can be established by at least one sub-server 2. In other embodiments, the storage area 60 may also include at least one magnetic region of the storage server 601.

In one embodiment, the proxy device 70 can be a proxy server. The proxy device 70 is configured for providing reverse proxy and load balancing when the files are stored by the object storage.

Figure 4:
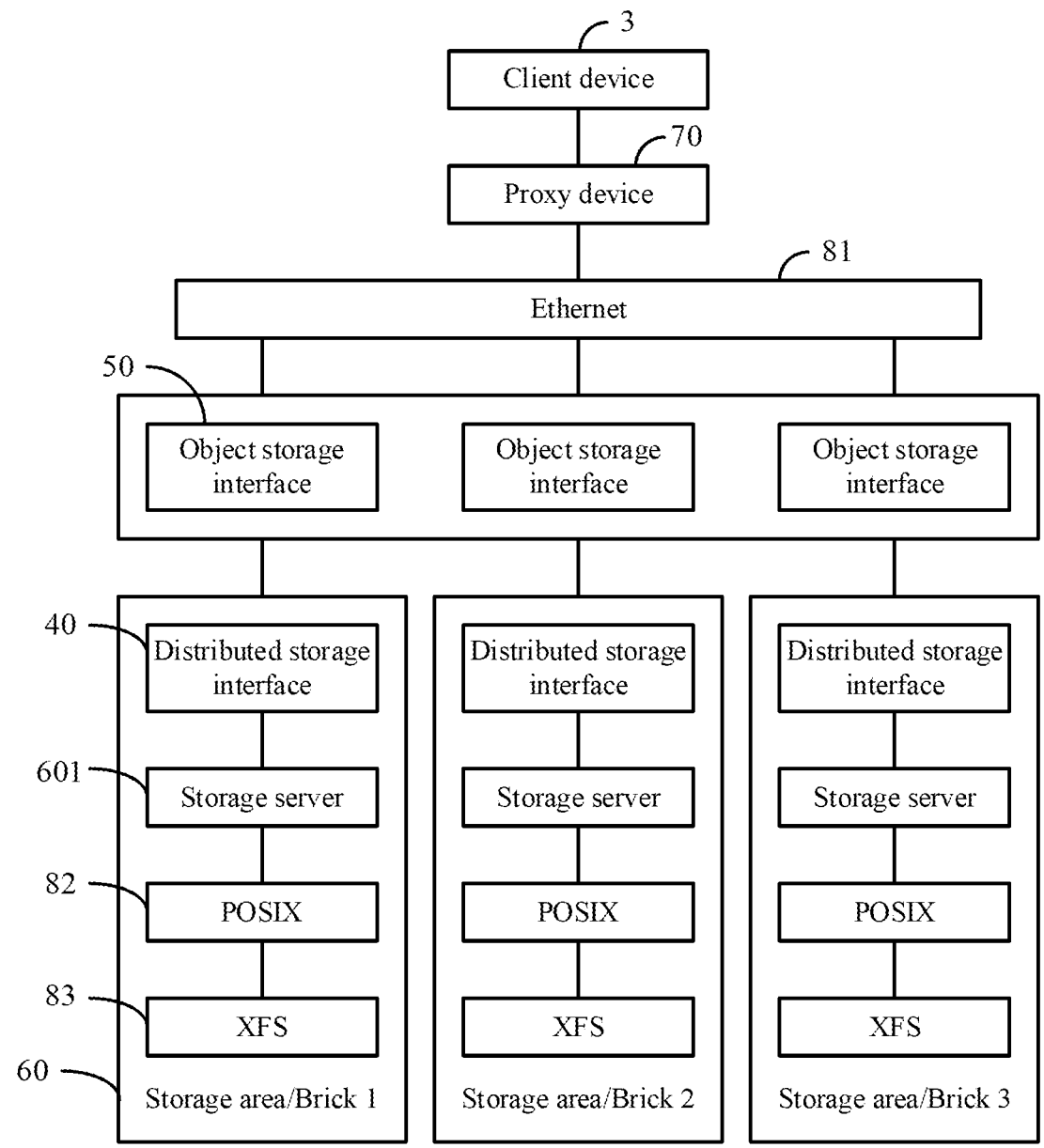
FIG. 4 is a block diagram of an embodiment of an architecture of the distributed storage management system according to the present disclosure.

In one embodiment, each of the number of storage areas 60 defines a distributed storage unit 40 and an object storage unit 50. The proxy device 70 communicates with the number of storage areas 60 through a local area network, such as an ethernet 81 (as shown in FIG. 4).

Figure 3:
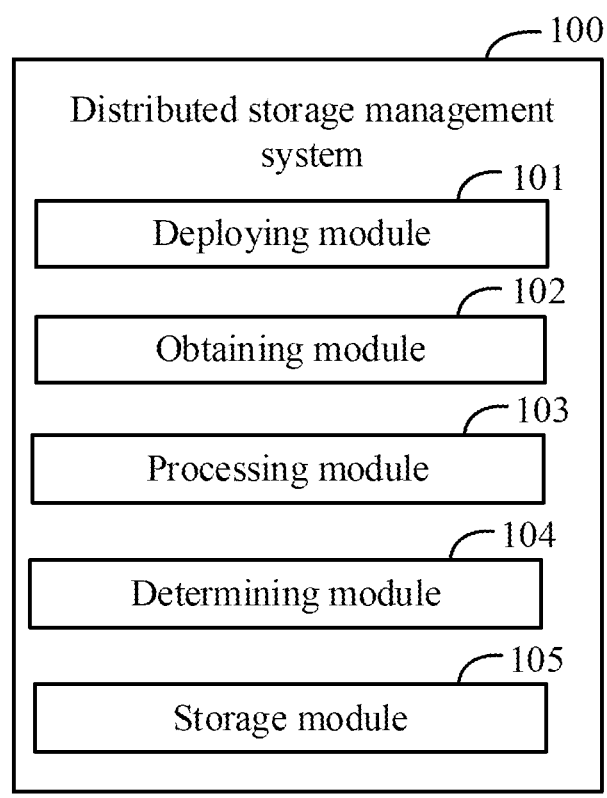
FIG. 3 is a block diagram of an embodiment of a distributed storage management system according to the present disclosure.

As illustrated in FIG. 3, the server 1 runs a distributed storage management system 100. The distributed storage management system 100 at least includes a deploying module 101, an obtaining module 102, a processing module 103, a determining module 104, and storage module 105. The modules 101-105 can be collections of software instructions stored in the storage device 20 of the server 1 and executed by the processor 10. The modules 101-105 also can include functionality represented by hardware or integrated circuits, or by software and hardware combinations, such as a special-purpose processor or a general-purpose processor with special-purpose firmware.

The deploying module 101 is configured to deploy a sub-server 2 as the proxy device 70 by setting up a reverse proxy in the sub-server 2.

In one embodiment, the proxy device 70 can receive a network access connection request from the client device 3, and forward the network access connection request to the storage server 601 of the storage area 60. A result of the process by the storage server 601 is transmitted to the client device 3, thereby avoiding single point failure of the object storage unit 50 in the storage area 60.

In one embodiment, the proxy device 70 further carries with an operating environment of Linux distribution and Docker Engine for providing distributed file processing and management functions.

The deploying module 101 further deploys a number of storage areas 60 by partitioning magnetic regions of at least two sub-servers 2.

In one embodiment, the storage device of the sub-server 2 is divided into a number of magnetic regions, so as to establish the storage server 601 of the storage area 60, thereby facilitating distributed data storage within the storage server 601. In other embodiments, the storage area 60 may also include partial magnetic regions of a single storage server 601, so as to realize distributed data storage among different storage areas 60 of the single storage server 601, thereby reducing hardware costs.

In one embodiment, an operating environment including Linux distribution and Docker Engine is installed in the storage server 601 as the distributed storage unit 40 for providing the distributed storage service.

In one embodiment, the deploying module 101 sets a read cache capacity (performance.cache-size) and the number of I/O operation threads (performance.io-thread-count) of the storage server 601, thereby meeting the requirements of object storage service. For example, the read cache capacity is 512 MB, and the number of I/O operation threads is 64.

The deploying module 101 further sets the object storage unit 50 in each of the storage areas 60.

In one embodiment, the object storage unit 50 can be a Minio service interface. The deploying module 101 imports a pre-customized and packaged Minio Docker Images into a setting file of the storage server 601, to form the object storage unit 50.

It should be noted that, in order to store and read files correctly, the deploying module 101 sets same credential token for each of the object storage units 50, to add access authority for the storage files, and ensures a consistency of a mounting point of each storage server 601, thereby ensuring that the files is correctly access.

The obtaining module 102 obtains files to be stored from the user.

In one embodiment, when the user logs into the distributed storage application with an account and a password on the client device 3 and uploads file to be stored to the distributed storage application, the obtaining module 102 obtains the file to be stored. In other embodiments, the user can also use an account and a password on the client device 3 to log into the distributed storage application through a webpage, and upload the file to be stored through the webpage.

In one embodiment, the client device 3 includes multiple client interfaces which communicate with the number of storage areas 60. The number of client interfaces is the same as the number of the storage areas 60.

The processing module 103 performs distributed processing on the files to be stored.

Referring to FIG. 4, the distributed storage management system 100 is established based on an architecture of Gluster. In detail, the processing module 103 receives the files to be stored from the client device 3, sets I/O cache to cache the files to be stored in a high-speed memory, pre-reads core files of Gluster and the directory entries of the files to be stored, creates multiple distributed volumes, stripe volumes, or replication volumes, thereby completing the distributed processing of the file, and distribute the cached files to the plurality of distributed volumes, stripe volumes, or replication volumes according to the directory entries.

The determining module 104 is configured to determine a storage requirement of the files to be stored which the user requires to store.

In one embodiment, the storage requirements at least include file storage and object storage. Data based on the file storage can be directly read and written, and read and write operations of data and metadata based on the object storage are separated. The metadata is first read to determine a data location, and then data read and write operations are performed from the determined data location.

In one embodiment, when the user has log into the distributed storage application, the determining module 104 receives the login information (e.g., the user account) from the client device 3, recognizes the user identity according to the login information, and determines the storage requirement of the files to be stored according to the recognized user identity.

In detail, the distributed storage management system 100 pre-stores a relationship between user identities and storage requirements of the files to be stored, and the determining module 104 determines the storage requirement of the files to be stored according to the recognized user identity and the relationship between the user identities and the storage requirements.

For example, the user identity may be a position in an employment, and the relationship between the user identity and the storage requirements can include: the storage requirement of the files to be stored which the basic service personnel and the system management personnel require to store is the file storage, and the storage requirement of the files to be stored which the system developers require to store is the object storage. When the determining module 104 determines that the user identity is a basic service personnel or a system manager, the storage requirement of the files to be stored is determined to be the file storage. When the determining module 104 determines that the user identity is a system developer, the storage requirement of the files to be stored is determined to be the object storage.

In other embodiments, the determining module 104 determines whether a size of the obtained files to be stored is greater than a preset value. When the determining module 104 determines that the size of the obtained files to be stored is greater than the preset value, the module determines that the storage requirement of the files to be stored is the object storage. When the determining module 104 determines that the size of the obtained files to be stored is less than or equal to the preset value, the determining module 104 determines that the storage requirement of the files to be stored is the file storage. For example, the preset value is 500 GB. In other embodiments, the preset value can also be other suitable value according to user requirements.

If the storage requirement of the files to be stored which the user requires to store is determined to be the file storage, the storage module 105 is configured to store the distributed files in the number of storage areas 60 through the distributed storage unit 40.

In one embodiment, the storage module 105 stores the number of distributed volumes, stripe volumes, or replicated volumes of files into each of the storage areas 60 through the distributed storage unit 40.

As illustrated in FIG. 4, in detail, when the files to be stored is distributed into the distributed volumes, the stripe volumes, or the replication volumes, distributes the number of distributed volumes, stripe volumes, or replication volumes to each of clients of Gluster, each of clients of Gluster bypasses the object storage unit 50 and transmits the multiple distributed volumes, stripe volumes, or replication volumes to each of the distributed storage units 40. Each of the distributed storage units 40 further stores the distributed volumes, stripe volumes, or replication volumes into each of the storage servers 601, and mounts the stored distributed volumes, stripe volumes, or replication volumes on XFS 83 by POSIX 82.

If the storage requirement of the files to be stored which the user requires to store is determined to be the object storage, the storage module 105 further stores the distributed files in the number of storage areas 60 through the object storage unit 50 and the distributed storage unit 40.

In one embodiment, the storage module 105 creates metadata and object ID of the files in the distributed volumes, the stripe volumes, or the replicated volumes transmitted by the each of clients of Gluster, and stores the metadata, object ID, file data of the files to be stored into each of the storage server 601 through the distributed storage unit 40. In one embodiment, the metadata at least includes the storage location of each file data of the files to be stored, the file data, the metadata and object ID corresponding to the file data form an object of the files to be stored, the number of storage serves 601 respectively stores the file data, the metadata, and the object ID of each object of the files to be stored, the object storage unit 50 can manage storage of the objects of the files to be stored. Thus, the metadata and the file data (data blocks) in the distributed volumes, stripe volumes, or replication volumes can be stored separately, all and any of the data blocks can be found by reading the metadata, and the data blocks can be read at the same time.

In one embodiment, the storage module 105 transmits the distributed volumes, stripe volumes, or replication volumes to the object storage unit 50 based on the reverse proxy service provided by the proxy device 70, and stores the metadata, object ID, file data of the objects of the files in the distributed volumes, stripe volumes, or replication volumes into each of the storage servers 601 through the distributed storage unit 40. The object storage service provided by the object storage unit 50 and the distributed storage service provided by the distributed storage unit 40 realize the object storage of the files to be stored.

In one embodiment, the reverse proxy provided by the proxy device 70 enables file data transmission through other object storage units 50 when one of the object storage units 50 cannot operate normally, thereby improving the reliability and stability of data transmission, and effectively solving the problem of single point failure.

In one embodiment, the storage module 105 also performs load balancing on the multiple distributed volumes, stripe volumes, or replication volumes transmitted by the client device 3 through the proxy device 70. That is, the proxy device 70 can change the storage locations of the multiple distributed volumes, stripe volumes, or replication volumes according to the current storage capacity or remaining storage capacity of each storage area 60, so as to achieve load balancing of data storage.

Figure 5:
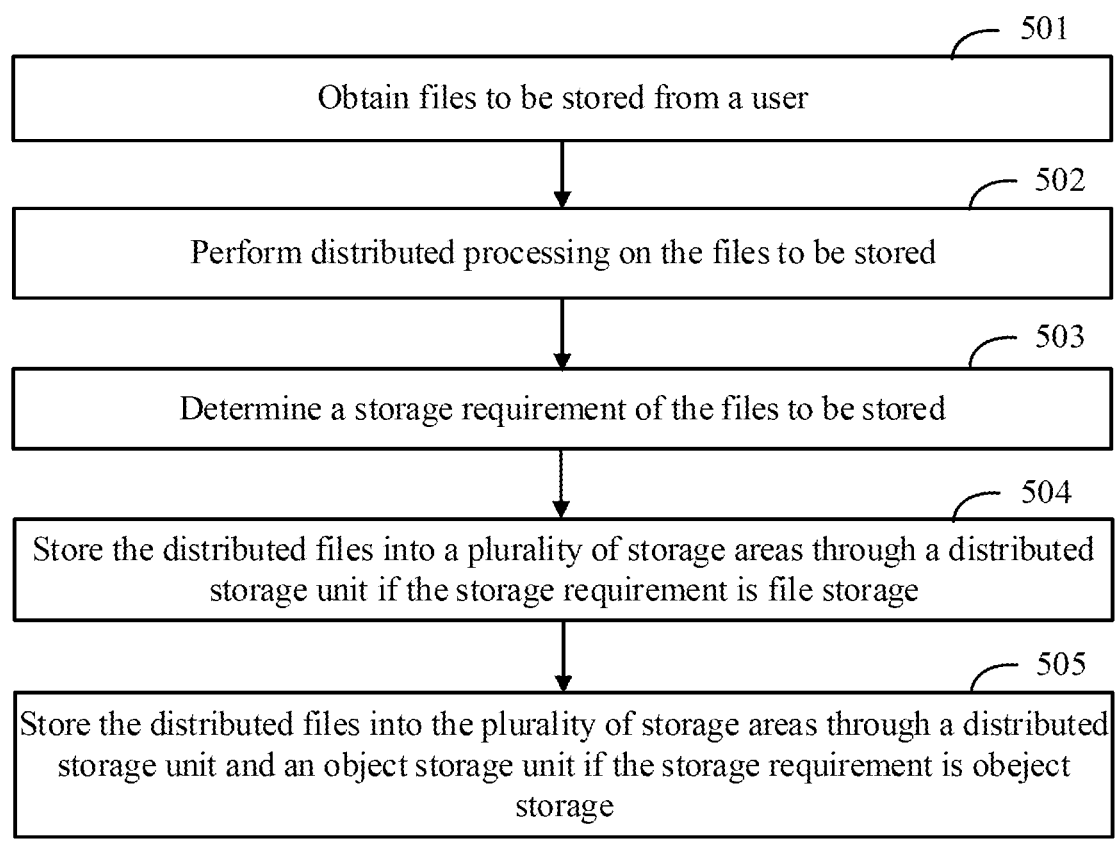
FIG. 5 illustrates a flowchart of an embodiment of a method for managing distributed storage according to the present disclosure.

FIG. 5 illustrates a flowchart of an embodiment of a method for managing distributed storage. The method is provided by way of example, as there are a variety of ways to carry out the method. The method described below can be carried out using the configurations illustrated in FIGS. 1-4, for example, and various elements of these figures are referenced in explaining the example method. Each block shown in FIG. 5 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 501.

At block 501, the obtaining module 102 obtains files to be stored from the user.

At block 502, the processing module 103 performs distributed processing on the files to be stored.

At block 503, the determining module 104 determines a storage requirement of the files to be stored which the user requires to store.

At block 504, if the storage requirement of the files to be stored which the user requires to store is determined to be the file storage, the storage module 105 stores distributed files into the number of storage areas 60 through the distributed storage unit 40.

At block 505, if the storage requirement of the files to be stored which the user requires to store is determined to be the object storage, the storage module 105 stores the distributed file into the number of storage areas 60 through the object storage unit 50 and the distributed storage unit 40.

The method further includes: the deploying module 101 deploying a sub-server 2 as the proxy device 70 by setting up a reverse proxy in the sub-server 2.

The method further includes: the deploying module 101 deploying a number of storage areas 60 by partitioning magnetic regions of at least two sub-servers 2.

The method further includes: the deploying module 101 setting the object storage unit 50 in each of the storage areas 60.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A server comprising:
   at least one processor; and
   a storage device coupled to the at least one processor and storing instructions for execution by the at least one processor to cause the at least one processor to:
   obtain files to be stored from a user;
   perform distributed processing on the files to be stored;
   determine a storage requirement of the files to be stored, wherein the storage requirement comprises file storage and object storage;
   store the distributed files into a plurality of storage areas through a distributed storage interface in response that the storage requirement is determined to be the file storage;
   store the distributed files in the plurality of storage areas through a distributed storage interface and an object storage interface in response that the storage requirement is determined to be the object storage;
   determine whether a size of the obtained files to be stored is greater than a preset value;
   determine that the storage requirement of the files to be stored is the object storage, in response that the size of the obtained files to be stored is determined to be greater than the preset value;
   determine that the storage requirement of the files to be stored is the file storage, in response that the size of the obtained files to be stored is determined to be equal to or less than the preset value;
   deploy a sub-server as a proxy device by setting up a reverse proxy service in the sub-server;
   deploy the plurality of storage areas by partitioning magnetic regions of at least two sub-servers; and
   set the object storage interface in each of the plurality of storage areas.

2. The server according to claim 1, wherein the at least one processor is further caused to:
   cache data of the files to be stored;
   pre-read directory entries of the files to be stored;
   create a plurality of distributed volumes, stripe volumes, or replication volumes; and
   distribute the cached files to the plurality of distributed volumes, stripe volumes, or replication volumes.

3. The server according to claim 2, wherein the at least one processor is further caused to:
   store the plurality of distributed volumes, stripe volumes, or replication volumes into each of the storage areas through the distributed storage interface.

4. The server according to claim 2, wherein the at least one processor is further caused to:
   create metadata and object ID corresponding to file data in the plurality of distributed volumes, stripe volumes, or replication volumes through the object storage interface; and
   store the metadata, the object ID, and the plurality of distributed volumes, stripe volumes, or replication volumes into the plurality of storage areas through the distributed storage interface.

5. The server according to claim 4, wherein the at least one processor is further caused to:
   transmit respectively the plurality of distributed volumes, stripe volumes, or replication volumes to the object storage interface based on the proxy device, wherein the proxy device provides the reverse proxy service and load balancing.

6. The server according to claim 1, wherein the at least one processor is further caused to:
   recognize an identity of the user in response to the user logging into a distributed storage application through a client device; and
   determine the storage requirement of the files to be stored according to the recognized user identity.

7. A method for managing distributed storage implemented in a server comprising:
   obtaining files to be stored from a user;
   performing distributed processing on the files to be stored;
   determining a storage requirement of the files to be stored, wherein the storage requirement comprises file storage and object storage;
   storing the distributed files into a plurality of storage areas through a distributed storage interface in response that the storage requirement is determined to be the file storage;
   storing the distributed files in the plurality of storage areas through a distributed storage interface and an object storage interface in response that the storage requirement is determined to be the object storage;
   determining whether a size of the obtained files to be stored is greater than a preset value;
   determining that the storage requirement of the files to be stored is the object storage, in response that the size of the obtained files to be stored is determined to be greater than the preset value;
   determining that the storage requirement of the files to be stored is the file storage, in response that the size of the obtained files to be stored is determined to be equal to or less than the preset value;
   deploying a sub-server as a proxy interface by setting up a reverse proxy service in the sub-server;
   deploying a plurality of storage areas by partitioning magnetic regions of at least two sub-servers; and
   setting the object storage interface in each of the plurality of storage areas.

8. The method according to claim 7, wherein performing distributed processing on the files to be stored comprises:
   caching data of the files to be stored;
   pre-reading directory entries of the files to be stored;
   creating a plurality of distributed volumes, stripe volumes, or replication volumes; and
   distributing the cached files to the plurality of distributed volumes, stripe volumes, or replication volumes.

9. The method according to claim 8, wherein storing the distributed files in a plurality of storage areas through a distributed storage interface comprises:
   storing the plurality of distributed volumes, stripe volumes, or replication volumes into each of the storage areas through the distributed storage interface.

10. The method according to claim 8, wherein storing the distributed files into a plurality of storage areas through a distributed storage interface further comprises:

creating metadata and object ID corresponding to file data in the plurality of distributed volumes, stripe volumes, or replication volumes through the object storage interface; and storing the metadata, the object ID, and the plurality of distributed volumes, stripe volumes, or replication volumes into the plurality of storage areas through the distributed storage interface.

11. The method according to claim 10, wherein storing the distributed files into the plurality of storage areas through a distributed storage interface further comprises:

transmitting respectively the plurality of distributed volumes, stripe volumes, or replication volumes to the object storage interface based on the proxy device, wherein the proxy device provides the reverse proxy service and load balancing.

12. The method according to claim 7, wherein determining a storage requirement of the files to be stored comprises:

recognizing an identity of the user in response to the user logging into a distributed storage application through a client device; and determining the storage requirement of the files to be stored according to the recognized user identity.

* * * * *